(12) United States Patent
Barghouthi et al.

(10) Patent No.: US 7,818,429 B2
(45) Date of Patent: *Oct. 19, 2010

(54) REGISTERING A RESOURCE THAT DELEGATES COMMIT VOTING

(75) Inventors: Soloman J. Barghouthi, Rochester, MN (US); Ian Robinson, Southampton (GB); Andrew John Schofield, Eastleigh (GB); Kevin William Sutter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/317,544

(22) Filed: Dec. 23, 2008

(65) Prior Publication Data

US 2009/0113441 A1 Apr. 30, 2009

Related U.S. Application Data

(63) Continuation of application No. 11/000,436, filed on Nov. 30, 2004, now Pat. No. 7,483,987.

(51) Int. Cl.
*G06F 15/173* (2006.01)
(52) U.S. Cl. ............................... 709/226; 709/230
(58) Field of Classification Search .......... 709/226, 709/230
See application file for complete search history.

(56) References Cited

U.S. PATENT DOCUMENTS

| 5,363,121 | A | * | 11/1994 | Freund | 718/101 |
| 5,799,305 | A | | 8/1998 | Bortvedt et al. | |
| 5,958,004 | A | | 9/1999 | Helland et al. | |
| 6,266,698 | B1 | | 7/2001 | Klein et al. | |
| 6,463,456 | B1 | * | 10/2002 | Kan et al. | 709/201 |
| 7,080,119 | B2 | * | 7/2006 | Felt et al. | 709/203 |
| 7,337,441 | B2 | * | 2/2008 | Felt et al. | 709/203 |
| 2003/0005172 | A1 | * | 1/2003 | Chessell | 709/316 |
| 2003/0046342 | A1 | | 3/2003 | Felt et al. | |
| 2005/0267897 | A1 | | 12/2005 | D'Costa et al. | |

* cited by examiner

Primary Examiner—Phuoc Nguyen
(74) Attorney, Agent, or Firm—Owen J. Gamon

(57) ABSTRACT

A computer system and storage medium that, in an embodiment, receive an allocation request for a resource and registers the resource as a non-voting participant if the resource desires to delegate commit voting to another resource. The registered resource is then prohibited from participating in an enclosing transactional context and instead is informed when the transaction completes. The resource is enlisted as a voting participant if the resource does not desire to delegate commit voting. In this way, when multiple resources are used in a transaction, a resource may be registered and receive notifications of transaction completion instead of being enlisted and voting on commit decisions. The result of a transaction in which a single resource takes responsibility for a number of other resources is that transaction completion avoids the two-phase commit protocol and the resulting performance degradation.

10 Claims, 4 Drawing Sheets

REGISTERING A RESOURCE THAT DELEGATES COMMIT VOTING

CROSS REFERENCE TO RELATED APPLICATION

This is a continuation application of U.S. patent application Ser. No. 11/000,436, filed Nov. 30, 2004 now U.S. Pat. No. 7,483,987, entitled "Registering a Resource that Delegates Commit Voting," which is herein incorporated by reference.

FIELD

An embodiment of the invention generally relates to computers. In particular, an embodiment of the invention generally relates to registering a resource that delegates commit voting in a transaction environment.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

Years ago, computers were isolated devices that did not communicate with each other. But, today computers are often connected in networks, such as the Internet or World Wide Web, and a user at one computer, often called a client, may wish to access information at multiple other computers, often called servers, via a network. Accessing and using information from multiple computers is often called distributed computing.

One of the challenges of distributed computing is the propagation of messages from one computer system to another. In many distributed computing systems connected via networks, to maintain data consistency it is critical that each message be delivered only once and in order to its intended destination site. For example, in a distributed database system, messages that are propagated to a destination site often specify updates that must be made to data that reside at the destination site. The updates are performed as a "transaction" at the destination site. Frequently, such transactions are part of larger distributed transactions that involve many sites. If the transactions are not delivered once and in order, problems with data consistency may occur, e.g., if database insert and update operations are out of order, the update attempts to modify a record that is not yet present.

To ensure safe data sharing in a distributed computing environment, transactions must share the properties of atomicity, consistency, isolation, and durability, denoted by the acronym ACID. Atomicity means that a transaction is considered complete if and only if all of its operations were performed successfully. If any operation in a transaction fails, the transaction fails. Consistency means that a transaction must transition data from one consistent state to another, preserving the data's semantic and referential integrity. While applications should always preserve data consistency, many databases provide ways to specify integrity and value constraints, so that transactions that attempt to violate consistency will automatically fail. Isolation means that any changes made to data by a transaction are invisible to other concurrent transactions until the transaction commits. Isolation requires that several concurrent transactions must produce the same results in the data as those same transactions executed serially, in some (unspecified) order. Durability means that committed updates are permanent. Failures that occur after a commit cause no loss of data. Durability also implies that data for all committed transactions can be recovered after a system or media failure. An ACID transaction ensures that persistent data always conform to their schema, that a series of operations can assume a stable set of inputs and working data, and that persistent data changes are recoverable after system failure.

One approach for ensuring that transactions are ACID in a distributed system is to use a two-phase commit protocol to propagate messages between the distributed computer systems. The two-phase commit protocol involves two phases: the prepare phase and the commit phase. In the prepare phase, the transaction is prepared at the destination site. When a transaction is prepared at a destination site, the database is put into such a state that it is guaranteed that modifications specified by the transaction to the database data can be committed. Once the destination site is prepared, it is said to be in an in-doubt state. In this context, an in-doubt state is a state in which the destination site has obtained the necessary resources to commit the changes for a particular transaction, but has not done so because a commit request has not been received from the source site. Thus, the destination site is in-doubt as to whether the changes for the particular transaction will go forward and be committed or instead, be required to be rolled back. After the destination site is prepared, the destination site sends a prepared message to the source site, so that the commit phase may begin.

In the commit phase, the source site communicates with the destination site to coordinate either the committing or rollback of the transaction. Specifically, the source site either receives prepared messages from all of the participants in the distributed transaction, or determines that at least one of the participants has failed to prepare. The source site then sends a message to the destination site to indicate whether the modifications made at the destination site as part of the distributed transaction should be committed or rolled back. If the source site sends a commit message to the destination site, the destination site commits the changes specified by the transaction and returns a message to the source site to acknowledge the committing of the transaction.

Alternatively, if the source site sends a rollback message to the destination site, the destination site rolls back all of the changes specified by the distributed transaction and returns a message to the source site to acknowledge the rolling back of the transaction. Thus, the two-phase commit protocol may be used to attempt to ensure that the messages are propagated exactly once and in order. The two-phase commit protocol further ensures that the effects of a distributed transaction are atomic, i.e., either all the effects of the transaction persist or none persist, whether or not failures occur.

Although two-phase commit processing can work well, it is expensive because of the high level of control communications and network traffic messages. In transaction processing systems, committing updates on completion of a transaction involves a relatively high processing overhead, which hurts performance. An alternative to the two-phase commit processing is one-phase commit processing, where a single site makes its own commit and rollback decisions without depending on other sites. Unfortunately, one-phase commit processing does not guarantee the ACID properties when multiple sites are involved.

If two or more resources are involved in a transaction, then two-phase commit control processing is used, along with its high overhead. But, if only a single resource is being used within a transactional context, then one-phase commit processing may be used, which has less overhead than two-phase commit processing.

Without a better way to handle two-phase commit processing, transactions will continue to suffer with impaired performance. Although the aforementioned problems have been described in the context of database transactions, they may occur in any type of transaction or application. Further although the source and destination sites have been described as if they exist on different computers attached via a network, some or all of them may be on the same computer.

SUMMARY

A computer system and storage medium are provided that, in an embodiment, receive an allocation request for a resource and registers the resource as a non-voting participant if the resource desires to delegate commit voting to another resource. The registered resource is then prohibited from participating in an enclosing transactional context and instead is informed when the transaction completes. The resource is enlisted as a voting participant if the resource does not desire to delegate commit voting. In this way, when multiple resources are used in a transaction, a resource may be registered and receive notifications of transaction completion instead of being enlisted and voting on commit decisions. The result of a transaction in which a single resource takes responsibility for a number of other resources is that transaction completion avoids the two-phase commit protocol and the resulting performance degradation.

DETAILED DESCRIPTION

In an embodiment, a connection manager receives allocation requests for multiple resources within a given transaction context, for which one or more resources indicate they wish to delegate their commit decision to another resource. A resource provider does this by indicating to a transaction manager that it is a transaction-synchronization provider and does not directly vote on the transactional outcome, but rather is merely an observer of the transactional outcome. Such synchronization-provider resources share the same persistent store as the voting resources they delegate to. When there is only a single resource contributing to the commit decision of the transaction, then a one-phase commit protocol may be used.

Figure 1:
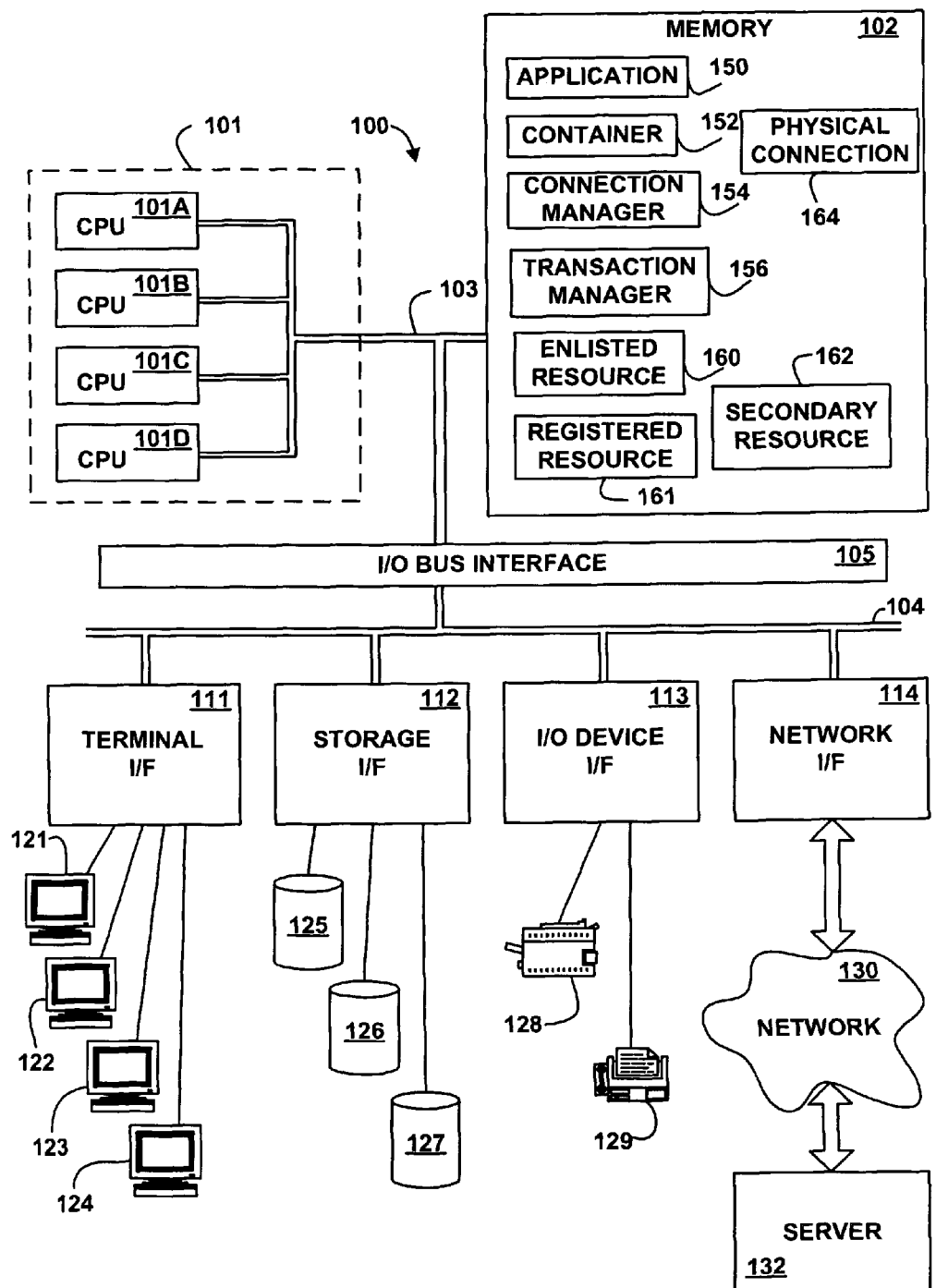
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a server 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes an application 150, a container 152, a connection manager 154, a transaction manager 156, an enlisted resource 160, a registered resource 161, a secondary resource 162, and a physical connection 164. Although the application 150, the container 152, the connection manager 154, the transaction manager 156, the enlisted resource 160, the registered resource 161, the secondary resource 162, and the physical connection 164 are illustrated as being contained within the memory 102 in the computer system 100, in other embodiments some or all of them may be on different computer systems and may be accessed remotely, e.g., via the network 130 and the servers 132. The computer system 100 may use virtual addressing mechanisms that allow the programs of the computer system 100 to behave as if they only have access to a large, single storage entity instead of access to multiple, smaller storage entities. Thus, while the application 150, the container 152, the connection manager 154, the transaction manager 156, the enlisted resource 160, the registered resource 161, the secondary resource 162, and the physical connection 164 are illustrated as residing in the memory 102, these elements are not necessarily all completely contained in the same storage device at the same time.

In an embodiment, the application 150 is implemented as a container-managed persistent bean, but in other embodiments any appropriate application may be used. A bean, e.g., a Java bean, is a reusable component. Java is an object-oriented programming language and environment focusing on defining data as objects and the methods that may be applied to those objects. Various programs in Java may be created by aggregating different Java beans. An entity bean represents a business object in a persistent storage mechanism, e.g. a database. Some examples of business objects are customers, orders, and products. Typically, each entity bean has an underlying table in a relational database (e.g., the enlisted resource 160), and each instance of the bean corresponds to a row in that table.

A bean may be either a session bean or an entity bean. Entity beans are persistent, allow shared access, have primary keys, and may participate in relationships with other entity beans. Because the state of an entity bean is saved in a storage mechanism, it is persistent. Persistence means that the entity bean's state exists beyond the lifetime of the application or the server process. The data in a database is persistent because it still exists even if the database server or the applications it services are powered off.

There are two types of persistence for entity beans: bean-managed and container-managed. With bean-managed persistence, the entity bean code contains the calls that access the database. If a bean has container-managed persistence, the container 152 automatically generates the necessary database access calls. The code for the entity bean does not include these calls.

Like a table in a relational database, an entity bean may be related to other entity beans. Developers implement relationships differently for entity beans with bean-managed persistence and those with container-managed persistence. With bean-managed persistence, the code implements the relationships. But, with container-managed persistence, the container 152 takes care of the relationships for the developer. For this reason, relationships in entity beans with container-managed persistence are often referred to as container-managed relationships.

The term container-managed persistence means that the container 152 handles all database access required by the entity bean. The bean's code contains no database access calls. As a result, the bean's code is not tied to a specific persistent storage mechanism. Because of this flexibility, even if the developer redeploys the same entity bean on different servers that use different databases, modifying or recompiling the bean's code is not necessary. In short, container-managed persistent entity beans are more portable.

Besides being much easier to develop and offering greater portability, container-managed persistent beans have additional benefits over bean-managed persistent beans, such as query, and caching. Also, container-managed persistent beans enable greater configuration and administration options, allowing dynamic control over access intent and connectivity parameters.

The application 150 sends transactions to the resources 160 and 161 via the container 152. The connection manager 154 allocates, enlists, and registers resources, as further described below with reference to FIGS. 2, 3, and 4.

The transaction manager 156 controls the transactions and indicates to each resource 160, 161, and 162 whether and when to commit or rollback the transaction, based on the global state of the transaction. The transaction manager 156 coordinates transactions between the resources 160, 161, and 162 using a two-phase commit protocol. The two-phase commit protocol provides the ACID properties of transactions across multiple resources. In the first phase of two-phase commit, the transaction manager 156 tells each resource to "prepare" to commit; that is, to perform all operations for a commit and be ready either to make the changes permanent or to undo all changes. Each resource responds, indicating whether or not the prepare operation succeeded. In the second phase, if all prepare operations succeed, the transaction manager 156 tells the resources 160, 161, and 162 to commit their changes; otherwise, the transaction manager 156 instructs the resources 160, 161, and 162 to roll back and indicates transaction failure to the application 150. The transaction manager 156 also converts the two-phase commit protocol to a one-phase commit protocol if the registered resource 161 is a synchronization provider, and resource 160 and 162 share the same physical connection 164, as further described below with reference to FIGS. 2, 3, and 4.

In an embodiment, the enlisted resource 160 is a JDBC (Java Database Connectivity: an API designed for use by Java database applications) non-XA capable resource, but in other embodiments any appropriate protocol may be used. In an embodiment, the registered resource 161 is a JMS (Java Message Service) non-XA capable resource that is a synchronization provider. A synchronization provider is a resource that needs to be notified when a transaction completes, but does not need to be part of the commit processing for the transaction. The secondary resource 162 is accessed by the registered resource 161 and is used, e.g., to store state data regarding the delivery of messages. The enlisted resource 160 and the secondary resource 162 share the physical connection 164.

An XA resource is a resource that is capable of participating in global transactions (XA transactions), which span multiple resources. An XA transaction involves a coordinating transaction manager, with one or more databases (or other resources, like JMS) all involved in a single global transaction. Non-XA transactions do not need a coordinating transaction manager, and a single resource is doing all its transaction work itself (this is sometimes called a local transaction). XA transactions are defined by the X/Open group specification on distributed, global transactions, but in other embodiments any appropriate specification may be used.

In an embodiment, the connection manager 154 includes instructions capable of executing on the processor 101 or statements capable of being interpreted by instructions executing on the processor 101 to perform the functions as further described below with reference to FIGS. 2, 3, 4, and 5. In another embodiment, the connection manager 154 may be implemented in microcode. In yet another embodiment, the connection manager 154 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the INFINIBAND architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the server 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
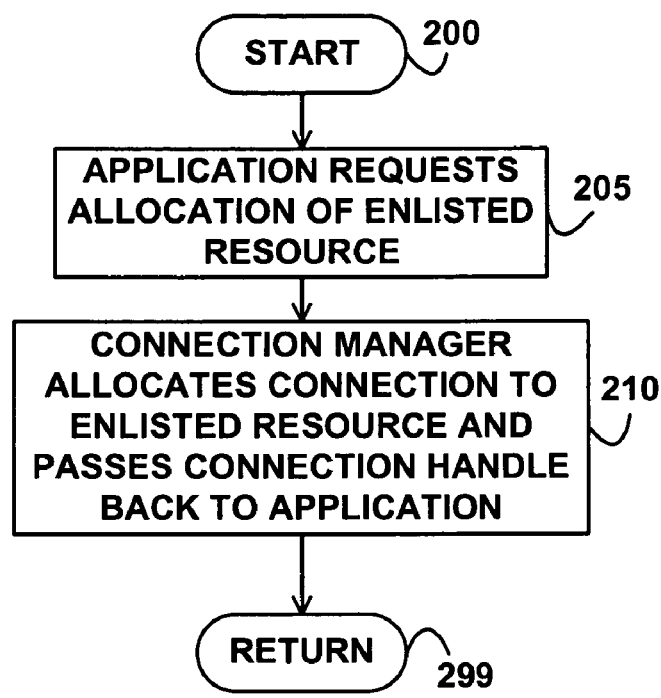
FIG. 2 depicts a flowchart diagram of example processing for allocating a resource, according to an embodiment of the invention.

FIG. 2 depicts a flowchart of example processing for allocating the enlisted resource 160, according to an embodiment of the invention. Control begins at block 200. Control then continues to block 205 where the application 150 requests allocation of the enlisted resource 160 via the connection manager 154. Control then continues to block 210 where the connection manager 154 allocates a connection to the enlisted resource 160 and passes a connection handle to the enlisted resource 160 back to the application 150. Control then continues to block 299 where the logic of FIG. 2 returns.

Figure 3:
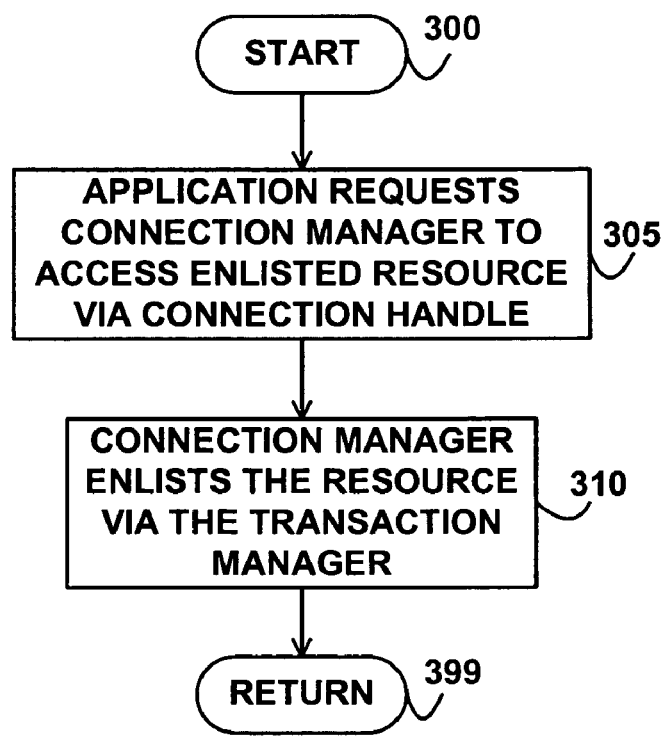
FIG. 3 depicts a flowchart of example processing for accessing a resource, according to an embodiment of the invention.

FIG. 3 depicts a flowchart of example processing for accessing the enlisted resource 160, according to an embodiment of the invention. Control begins at block 300. Control then continues to block 305 where the application 150 requests the connection manager 154 to access the enlisted resource 160 via the connection handle. Control then continues to block 310 where the connection manager 154 enlists the enlisted resource 160 via the transaction manager 156. Control then continues to block 399 where the logic of FIG. 3 returns.

Figure 4:
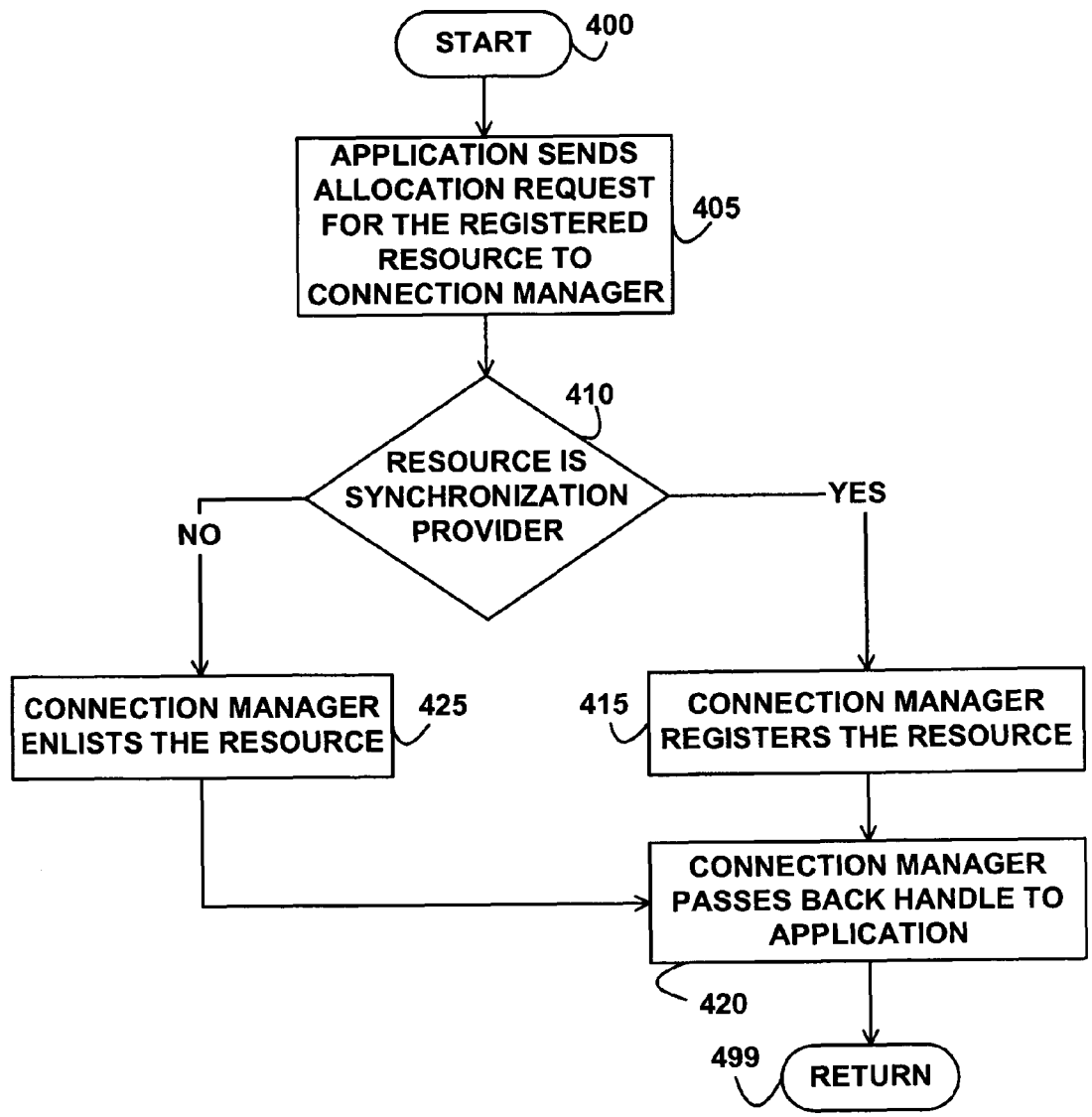
FIG. 4 depicts a flowchart of example processing for a synchronization resource, according to an embodiment of the invention.

FIG. 4 depicts a flowchart of example processing for a synchronization resource, according to an embodiment of the invention. Control begins at block 400. Control then continues to block 405 where the application 150 sends an allocation request for the registered resource 161 to the connection manager 154 as part of a two-phase commit protocol. Control then continues to block 410 where the connection manager 154 determines whether the resource 161 is a synchronization provider. A synchronization provider is a resource that desires to delegate responsibility for commit voting to another resource in the transaction. Instead of voting, the synchronization provider merely desires to receive notification that the transaction has ended.

If the determination at block 410 is true, then the resource is a synchronization provider, so control continues to block 415 where the connection manager 154 registers the resource 161. In this way, enlisting the resource, which requires a two-phase commit protocol is avoided if the resource is a synchronization provider.

In an embodiment, the connection manager 154 learns that the resource 161 is a synchronization provider using an interface such as:

```
public interface SynchronizationProvider {
Synchronization getSynchronization( ) throws ResourceException;
}
```

This interface informs the connection manager 154 that the resource 161 desires to delegate responsibility for commit voting to another resource, such as the enlisted resource 160, and that the resource 161 desires to merely be informed of transaction outcomes instead of voting in the enclosing transactional context. Registering an object means that the associated resource (e.g., a JMS resource, but in other embodiments any appropriate resource may be used) is prohibited by the transaction manager 156 from participating in the enclosing transactional context, meaning that the registered resource does not vote (prepare) on the transaction outcome and does not commit or rollback any state based on the transactional outcome. Instead, the registered resource is merely informed by the transaction manager 156 that the transaction is ending. For a registered resource, the synchronization object is used to drive the commit processing instead of an XA (global or user) resource. For example, in an embodiment, the transaction manager 156 invokes the Synchronization.beforeCompletion( ) method to inform the registered resource prior to prepare/commit/rollback calls and invokes the Synchronization.afterCompletion( ) method to inform the registered resource after prepare/commit/rollback calls. Thus, in an embodiment, methods such as Synchronization.beforeCompletion( ) and Synchronization.afterCompletion( ) are used instead of the XAResource.prepare( ) and XAResource.commit( ) calls.

Control then continues to block 420 where the connection manager 154 passes back a handle for the registered resource 161 to the application 150. Control then continues to block 499 where the logic of FIG. 4 returns.

If the determination at block 410 is false, then the resource is not a synchronization provider, so control continue to block 425 where the connection manager 154 enlists the resource. Enlisting a resource means that the resource participates in transaction context processing, e.g., voting (preparing) on a transactional outcome and committing or rolling back a state based on the transactional outcome. Control then continues to block 420 where the connection manager passes back a handle for the resource to the application 150. Control then continues to block 499 where the logic of FIG. 4 returns.

Figure 5:
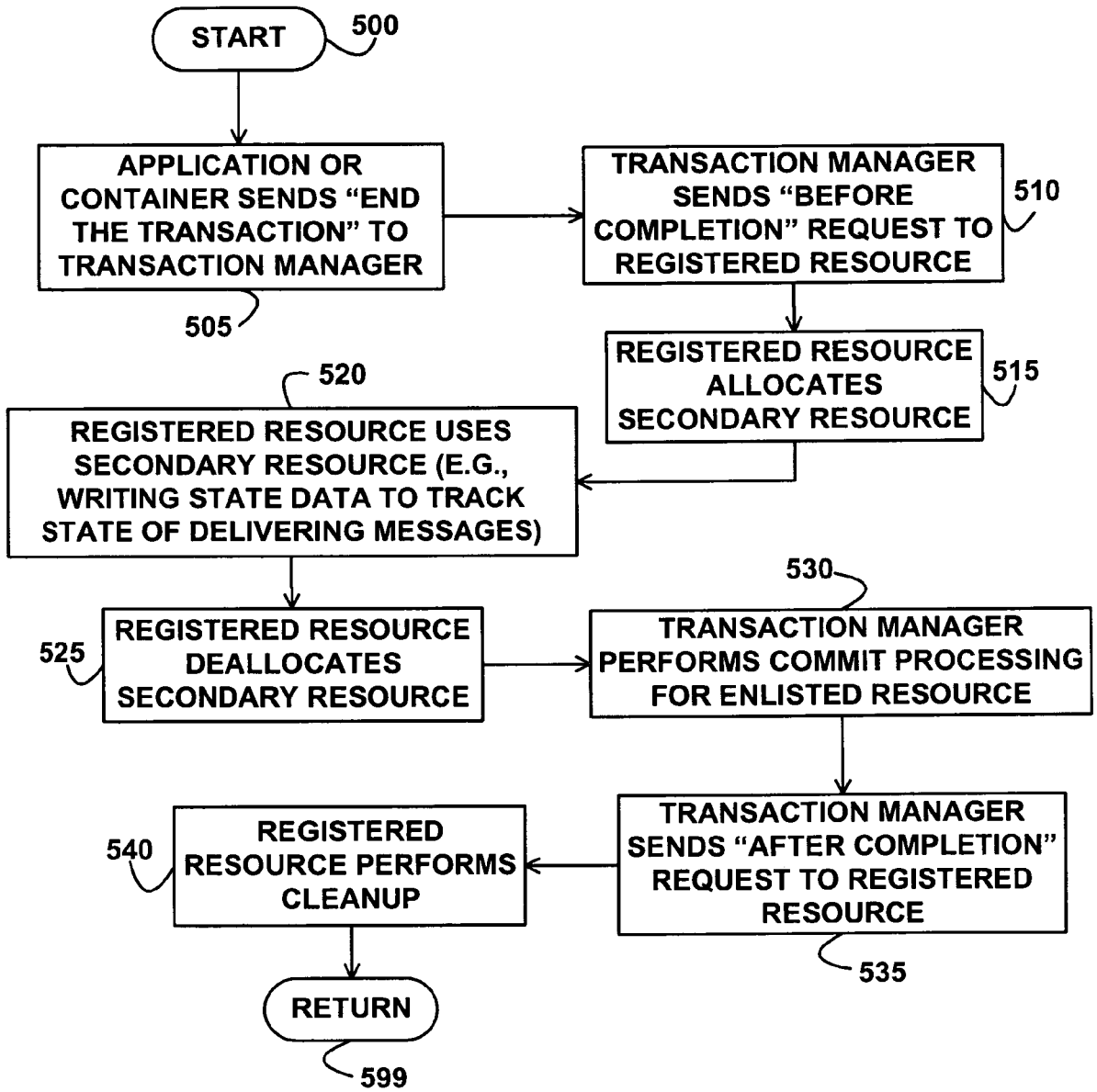
FIG. 5 depicts a flowchart of example processing for handling the end of a transaction, according to an embodiment of the invention.

FIG. 5 depicts a flowchart of example processing for handling the end of a transaction, according to an embodiment of the invention. Control begins at bock 500. Control then continues to block 505 where the application 150 or the container 152 sends an request to end the transaction to the transaction manager 156. Control then continues to block 510 where the transaction manager 156 sends a "before completion" request to the registered resource 161. Control then continues to block 515 where the registered resource 161 allocates the secondary resource 162. The secondary resource 162 is sharing the physical connection 164 with the enlisted resource 160. Control then continues to block 520 where the registered resource 161 uses the secondary resource 162, e.g., to write state data to track the state of delivering messages. But, in other embodiments, the secondary resource 162 may be used for any appropriate purpose.

Control then continues to block 525 where the registered resource 161 deallocates the secondary resource 162. Control then continues to block 530 where the transaction manager 156 performs commit processing for the enlisted resource 160. All resource updates performed via either the enlisted resource 160 or the secondary resource 162 are committed. Control then continues to block 535 where the transaction manager sends an "after completion" request to the registered resource 161. Control then continues to block 540 where the registered resource 161 performs clean up. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A storage medium encoded with instructions, wherein the instructions when executed comprise:
    receiving an allocation request for a first resource as part of a two-phase commit protocol;
    determining whether the first resource desires to delegate commit voting to an enlisted resource;
    if the first resource desires to delegate commit voting to the enlisted resource, converting the two-phase commit protocol to a one-phase commit protocol, wherein the converting further comprises
        registering the first resource as a non-voting participant, wherein the first resource accesses a secondary resource, and wherein the enlisted resource and the secondary resource share a physical connection,
        prohibiting the first resource from voting in an enclosing transactional context, and
        performing commit processing for the enlisted resource; and
    if the first resource does not desire to delegate commit voting to the enlisted resource, enlisting the first resource as a voting participant in the enclosing transactional context.

2. The storage medium of claim 1, further comprising:
    if the first resource desires to delegate commit voting to an enlisted resource, informing the first resource that a transaction has ended.

3. The storage medium of claim 1, wherein the converting further comprises:
    passes a handle for the first resource to an application that sent the allocation request.

4. The storage medium of claim 1, wherein the determining whether the first resource desires to delegate commit voting to the second resource further comprises:
    determining whether an indication has been received, wherein the indication indicates that the first resource comprises a synchronization provider in a local transaction.

5. The storage medium of claim 4, wherein the synchronization provider is notified when the transaction completes, but does not perform the commit processing for the transaction.

6. A computer system comprising:
    a processor; and
    a memory connected to the processor, wherein the memory is encoded with instructions, and wherein the instructions when executed on the processor comprise:
        receiving an allocation request for a first resource as part of a two-phase commit protocol,
        determining whether the first resource desires to delegate commit voting to an enlisted resource,
        if the first resource desires to delegate commit voting to the enlisted resource, converting the two-phase commit protocol to a one-phase commit protocol, wherein the converting further comprises registering the first resource as a non-voting participant, wherein the first resource accesses a secondary resource, and wherein the enlisted resource and the secondary resource share a physical connection, prohibiting the first resource from voting in an enclosing transactional context, and performing commit processing for the enlisted resource, and
        if the first resource does not desire to delegate commit voting to the enlisted resource, enlisting the first resource as a voting participant in the enclosing transactional context.

7. The computer system of claim 6, wherein the instructions further comprise:
    if the first resource desires to delegate commit voting to an enlisted resource, informing the first resource that a transaction has ended.

8. The computer system of claim 6, wherein the converting further comprises:
    passes a handle for the first resource to an application that sent the allocation request.

9. The computer system of claim 6, wherein the determining whether the first resource desires to delegate commit voting to the second resource further comprises:
    determining whether an indication has been received, wherein the indication indicates that the first resource comprises a synchronization provider in a local transaction.

10. The computer system of claim 9, wherein the synchronization provider is notified when the transaction completes, but does not perform the commit processing for the transaction.

* * * * *